United States Patent [19]
Bauer et al.

[11] Patent Number: 6,134,451
[45] Date of Patent: Oct. 17, 2000

[54] MOBILE RADIO TELEPHONE SET WITH A CONTROL SIGNAL GENERATOR

[75] Inventors: Harald Bauer; Peter Kempf, both of Nürnberg; Andreas Bening, Röthenbach/Pegnitz, all of Germany

[73] Assignee: U.S. Philips Corporation, New York, N.Y.

[21] Appl. No.: 09/177,958

[22] Filed: Oct. 23, 1998

[30] Foreign Application Priority Data

Oct. 25, 1997 [DE] Germany .................... 197 47 275

[51] Int. Cl.⁷ .................................................. H04B 1/38
[52] U.S. Cl. .................... 455/550; 455/343; 455/574
[58] Field of Search ...................... 455/343, 234.1, 455/236.1, 574, 575, 266, 550; 326/37

[56] References Cited

U.S. PATENT DOCUMENTS

| 5,001,776 | 3/1991 | Clark | 455/226 |
| 5,307,512 | 4/1994 | Mitzlaff | 455/126 |
| 5,321,840 | 6/1994 | Ahlin et al. | 395/700 |

FOREIGN PATENT DOCUMENTS

0401763A2  12/1990  European Pat. Off. .......... G06F 1/04

*Primary Examiner*—Edward F. Urban
*Assistant Examiner*—Blane J. Jackson
*Attorney, Agent, or Firm*—Dicran Halajian

[57] ABSTRACT

A mobile radio telephone set includes modules which are connectable by control signals. The modules include a control signal generator and a digital signal processor with a memory. The control signal generator is connected to the memory which stores at least one data word for a corresponding control signal. For rapidly and flexibly changing the control signals, the memory supplies data words which contain two control signals for at least two control lines coupled to the control signal generator. Each data word supplied by the memory contains at least two control signals in coded form. Each time a data word is supplied by the memory, at least two new control signals can be conveyed to the control lines. As a result, a selectable number of control signals may be changed simultaneously and flexibly because random data words can be stored in the memory.

7 Claims, 3 Drawing Sheets

MOBILE RADIO TELEPHONE SET WITH A CONTROL SIGNAL GENERATOR

FIELD OF THE INVENTION

The invention relates to a mobile radio telephone set comprising a plurality of modules connectable by means of control signals, at least one control signal generator coupled by control lines and at least one memory for storing at least one data word for one control signal.

Furthermore, the invention relates to a control signal generator for connecting at least one module coupled by a control line by means of a control signal, the control signal generator comprising at least one memory for storing at least one data word for one control signal, and a digital transmission system comprising such a control signal generator.

BACKGROUND OF THE INVENTION

From EP 0 401 763 is known a system for generating control signals in which a plurality of control signals and many signal changes may be generated which are necessary for controlling a digital mobile radio telephone set in a TDMA system. The control signals are therein changed by the successive processing of instructions which are stored in an instruction memory (101). As is shown in FIG. 6 of the associated description (page 4, lines 3–19), a change of a control signal on a control line is preferably determined by a relative time indication defining the distance in time to the respective previous change irrespective of the associated control line. For the case where a certain instant can be defined only by an absolute time section (At1) for the distance to a zero point of the system clock (page 4, lines 9–12), a start register (107) is used for changing a control signal at that instant. The start register contains a plurality of data words having two respective sections in which are stored, on the one hand, the absolute time section (108) and, on the other hand, the address section (109) of the change-assigned instruction in the instruction memory (see FIG. 9). For the remaining changes of the control signals, a work register (112) is used which has a similar structure. By means of the contents of start and work register, the instruction stored at the predefined address is called in at the predefined instant and led to the control lines (terminals A, B, C, D, . . . ). The instructions in the instruction memory are made up of at least four sections. In a first section (terminal assigning section 71) is stored a data word which features the control line (for example, terminal A) on which the respective control signal (for example, timing signal 601) is to be supplied. In the second section (terminal operation assigning section 72) the operation to be carried out for the respective control line (i.e. the change of a control signal) is stored (603). By means of the condition query in the third section (condition section 74) there may be defined whether an external condition for executing the instruction is to be queried or taken into account, respectively. The fourth section (waiting time assigning section 73) denotes a value for the time (Mt1) for which the execution of the next instruction (82) is to be waited. This value is transferred to the respective section (waiting time section 113) in the work register whereas the address for the next instruction is incremented. Thus, with a state of the art control signal generator only a single control signal for a certain control line can be changed at a certain instant. More particularly in systems comprising a plurality of modules which have respective different control signals such as, for example, in a mobile radio telephone set for a digital transmission system with a TDMA method, a faster control of the control signals may be required.

SUMMARY OF THE INVENTION

Therefore, it is an object of the invention to provide a mobile radio telephone set with a control signal generator that makes a change of various control signals possible in a very rapid and flexible manner.

The object is achieved in that the memory supplies data words containing respective control signals for at least two control lines coupled to the control signal generator. According to the invention, each data word supplied by the memory contains at least two control signals in coded form. Each time a data word is supplied by the memory, at least two new control signals can be conveyed to the control lines. This provides that various control signals can be changed simultaneously and flexibly because arbitrary data words can be stored in the memory. The most advantageous are data words containing control signals (for example, in a hexadecimal code) for all the control lines coupled to the control signal generator. All the control signals may then be changed with each data word, so that no problems occur resulting from the fact that a plurality of control signal changes are desired within a brief period of time or at the same instant. This especially holds for mobile radio telephone sets in which a plurality of modules are controlled by such control signals (for example, energy saving modes on/off). When a part of the control signals is not changed, the associated data word contains for these specified control lines the respective control signal valid thus far. To provide that a control signal is not changed, the same data word is to be supplied. The control may be adapted to changes by simple changes of the memory contents. More particularly, the memory may be realized in a digital signal processor (DSP) or the memory area already available in a DSP may be used. The transfer of the data words to the control signal generator may advantageously be controlled by the processor core of the DSP by means of a DSP interrupt routine.

In a preferred embodiment of the invention, the memory periodically alternately supplies a data word for an instant of a control signal change and a data word for control signals which have alternately been stored at addresses in the memory which are to be incremented or decremented. Two different data words form a respective data word pair (tuple) which completely describes an event. The separate storage makes it possible to read and process the data words in a simple fashion. However, it is also possible to store a, possibly coded, data word via a later separation. Furthermore, the storing at continuous addresses permits a realization with reduced hardware.

In a further embodiment, a memory register coupled to the memory stores the data word that is stored at the next address in the memory. The automatic buffering of each next data word in a memory register provides that the memory is accessed in two phases. No address need be given when the memory register is accessed, so that a faster routine is possible. For this purpose, the loading of the memory register by the reading of a certain address from the memory is to be controlled separately, so that particularly the memory need not be directly integrated with the control signal generator.

Advantageously, the memory register, when accessed for the first time, periodically applies a data word for an instant of a control signal change to a time register and when accessed for the second time applies a data word for control signals to a control signal register. The defined order makes a successive reading of the memory possible with low circuitry and cost.

Advantageous embodiments of the invention are defined in the further claims.

The object is furthermore achieved by a control signal generator and by a digital transmission system comprising a control signal generator in that the memory supplies data words containing control signals for at least two control lines coupled to the control signal generator.

These and other aspects of the invention will be apparent from and elucidated with reference to the embodiments described hereinafter.

DETAILED DESCRIPTION OF THE INVENTION

Figure 1:
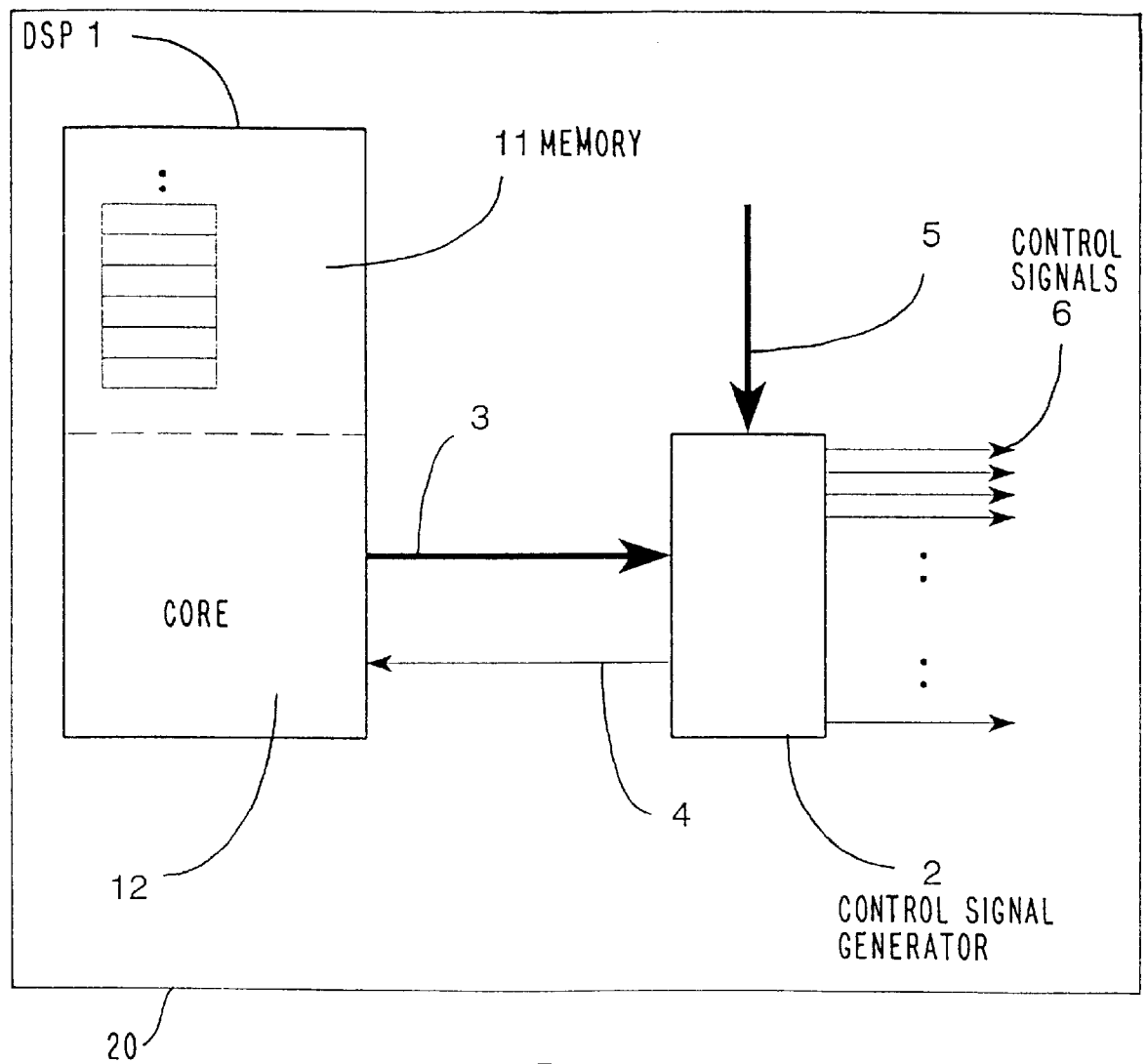
FIG. 1 shows a block circuit diagram of a digital signal processor (DSP) and of a control signal generator in a mobile radio telephone set.

In FIG. 1 is shown a digital signal processor (DSP) 1 comprising a memory 11 and a processor core 12 and a control signal generator 2 of a mobile radio telephone set. The DSP 1 is connected to the control signal generator 2 by a data line 3 and an interrupt line 4. Furthermore, a periodic timer is coupled which produces a timing signal 5. The periodic timer is realized as a counter which is incremented by the system clock and applies its count 5 to the control signal generator 2. The control signal generator 2 renders control signals 6 available on its outputs for connected modules of the mobile radio telephone set which modules are not represented.

In the memory 11 which is integrated with the DSP I in this embodiment is periodically alternately stored a data word for an instant of a control signal change and a data word for control signals 6. An instant and a control signal change then together form a data word pair. The data words are continuously addressed so that the address for reading the data words based on the data word for the first stored instant is only to be incremented. The data words are applied to the control signal generator 2 by the data line 3, which generator in a reaction to this initializes by the interrupt line 4 the reading of the next data word pair.

Figure 2:
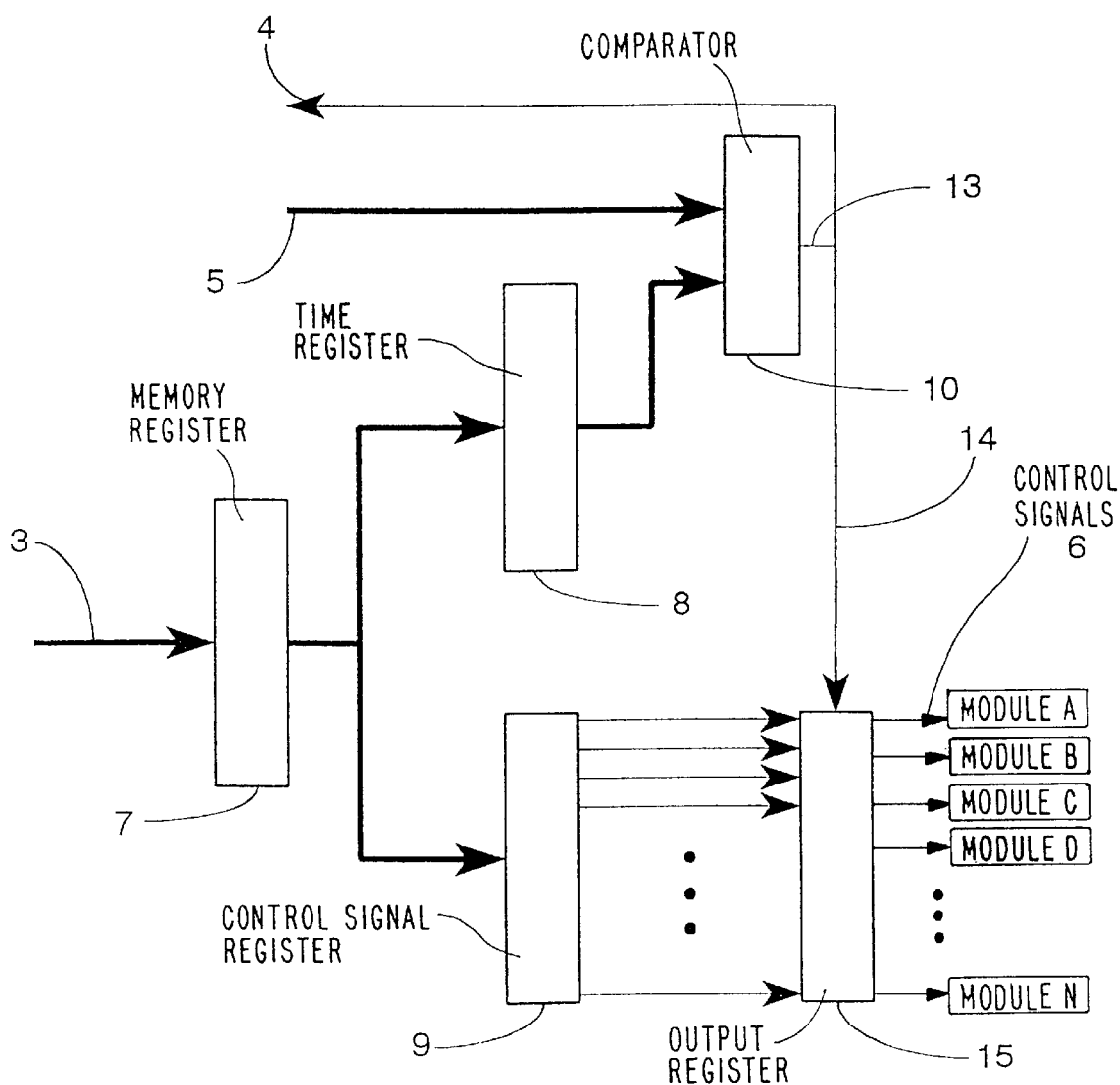
FIG. 2 shows a detailed block circuit diagram of the control signal generator.

FIG. 2 shows a control signal generator 2 in more detailed form. By the data line 3 the data words reach the memory register 7 in which they are buffered. The interrupt on the interrupt line 4 starts an interrupt routine in the processor core 12 which routine permits not only the reading of the next data word pair from the memory 11 but also a first and a second access to the memory register 7. With the first access, the data word for the instant of the next control signal change is loaded from the memory register 7 into a time register 8 and with the second access the data word for the control signals 6 into a control signal register 9. A comparator 10 compares the contents of the time register 8 with the count 5 and, if the two values match, produces a match signal 13. For this reason, the instant for a control signal change in relation to the periodic timer is determined and stored as a data word. When a counter is used as a periodic timer, the smallest distance in time between two control signal changes is only limited by the frequency of the clock by which the counter is incremented.

Based on the match signal 13, an interrupt 4 is applied to the processor core 12 and a read signal 14 to an output register 15. The output register 15 is coupled to the control signal register 9 and loads the control signals 6 upon reception of the read signal 14. Since the control lines are directly connected to the output register 15, the associated control signals 6 are thus supplied at the stored instant. Simultaneously, by means of the interrupt 4, the next data word pair is read from the memory 11. The memory register 7 is then only used for buffering a data word so that time register 8 and control signal register 9 can be loaded with the respective data word without the necessity of addressing the memory 11.

Figure 3:
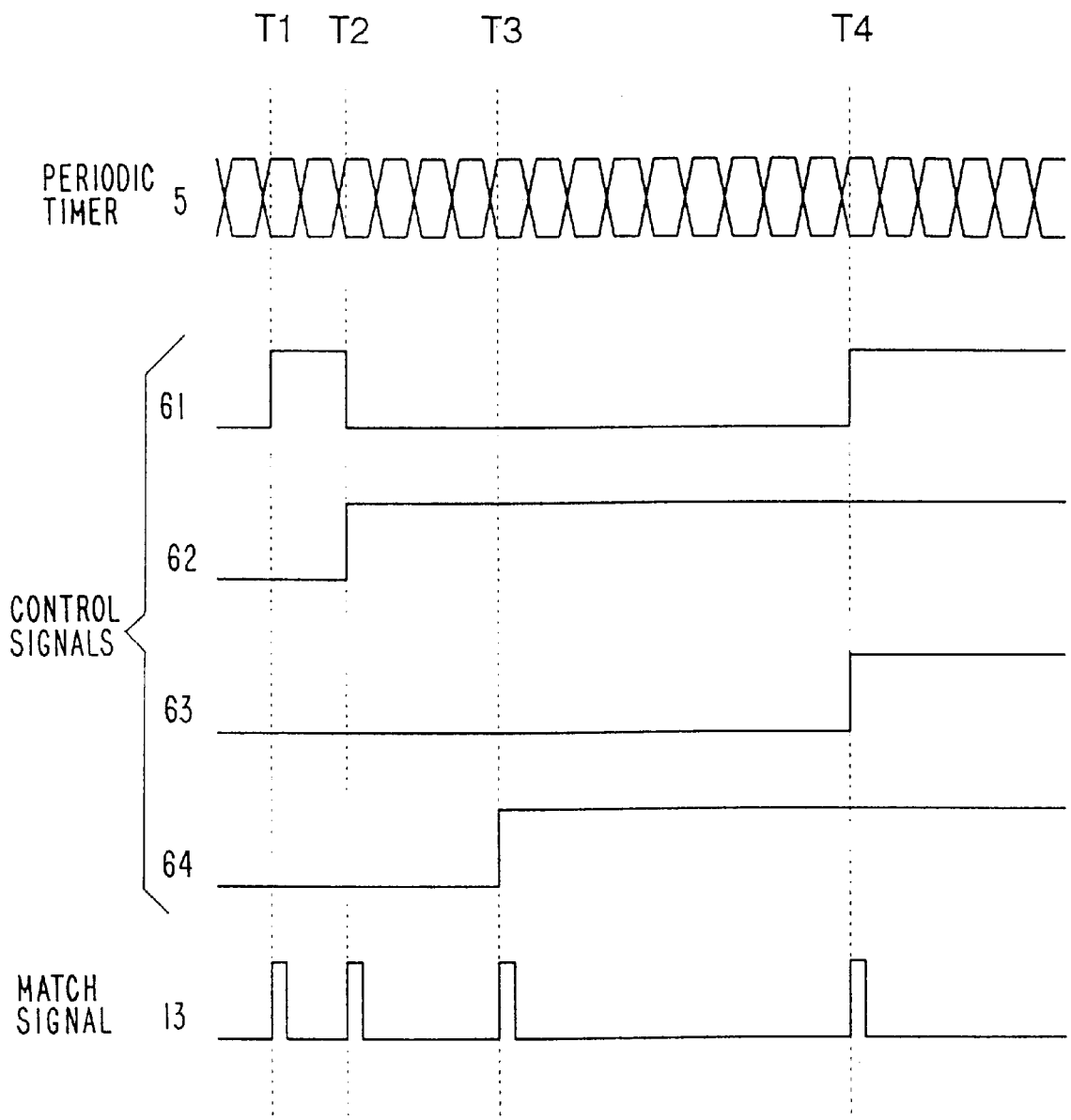
FIG. 3 shows a diagram with time curves of control signals.

FIG. 3 shows the time curves of four control signals 61, 62, 63 and 64. The top row shows the curve of the periodic timer 5 and below that the four control signals 61 to 64. The curve 13 shows the match signal 13 which triggers a respective interrupt 4 and read signal 14. The four marked instants T1, T2, T3 and T4 feature each an instant at which a control signal is to be changed. At these instants, the count of the counter incremented by the timing signal 5 matches a stored instant for a control signal change.

The Table shows the data set stored in the memory 11 and which produces the curve shown in FIG. 3. At the first address n is stored a data word for the first instant T1 of a control signal change. At the address n+1 incremented by 1 is stored a data word for all the control signals 61–64 to be assigned a value as from this instant T1 onwards. Further data word pairs are given at successive addresses for which a hexadecimal code is used.

| Address | Data |
| --- | --- |
| n | 0x2FF1/T1 |
| n + 1 | 0x0001 |
| n + 2 | 0x2FF3/T2 |
| n + 3 | 0x0002 |
| n + 4 | 0x2FF7/T3 |
| n + 5 | 0x000A |
| n + 6 | 0x3000/T4 |
| n + 7 | 0x000F |

At the instant T1, the count is 0×2FF1, so that the comparator 10 detects the match with the data word in the time register 8. As a result, based on the read signal 14, the data word 0×0001 is unloaded from the control signal register 9 as a binary value and loaded into the output register 15. In this manner, the four controls signals 61–64 are applied to the connected control lines. This means that the control signal 61 (corresponds to the LSB as regards the binary value) obtains the "1" value and the other 62–64 are set to the "0" value or retain the "0" value. At the same time, due to the interrupt 4, a first and a second access to the memory register 7 is initiated. Always the data word stored at the next address is buffered automatically in the memory register 7 to simplify the reading from the memory 11. In the case of an interrupt 4, the memory register 7 is accessed twice and the contents of the first access are transferred to the time register 8 and of the second access to the control signal register. Once the count 5 reaches for the next control signal change the instant T2 now stored in the time register 8, the comparator 10 produces the next match signal 13 and the routine repeats itself.

What is claimed is:

1. A mobile radio telephone set comprising a plurality of modules connectable by control signals; a control signal generator having control lines, a memory for storing data words for said control signals; wherein said memory supplies said data words containing respective control signals for at least two of said control lines; wherein the memory periodically alternately supplies a first data of said data words for an instant of a control signal change and a second data of said data words for control signals which have alternately been stored at addresses in the memory which are to be incremented or decremented.

2. The mobile radio telephone set as claimed in claim 1, wherein the control signal generator comprises a memory register coupled to the memory, said memory register storing a data word that is stored at a next address in the memory.

3. The mobile radio telephone set as claimed in claim 2, wherein the memory register periodically supplies, when accessed for a first time, a first data word for an instant of a control signal change to a time registers, and when accessed for a second time, applies a second data word for said control signals to a control signal register.

4. The mobile radio telephone set as claimed in claim 3, wherein, when the time register matches a timing signal of a periodic timer, a comparator supplies a match signal.

5. The mobile radio telephone set as claimed in claim 4, wherein an output register coupled to the control lines unloads the control signals from the control signal register when the match signal is received, and wherein a processing unit activates a first and a second access to the memory register when the match signal is received.

6. A control signal generator for connecting by means of a control signal at least one module coupled by a control line to at least one memory for storing at least one data word for said control signal, wherein the memory supplies data words containing respective control signals for at least two control lines coupled to the control signal generator, and wherein the memory periodically alternately supplies a first data of said data words for an instant of a control signal change and a second data of said data words for control signals which have alternately been stored at addresses in the memory which are to be incremented or decremented.

7. A digital transmission system with a control signal generator for connecting by means of a control signal at least one module coupled by a control line to at least one memory for storing at least one data word for one control signal, wherein the memory supplies data words containing respective control signals for at least two control lines coupled to the control signal generator, and wherein the memory periodically alternately supplies a first data of said data words for an instant of a control signal change and a second data of said data words for control signals which have alternately been stored at addresses in the memory which are to be incremented or decremented.

* * * * *